(12) United States Patent
El Sherif et al.

(10) Patent No.: US 12,493,333 B2
(45) Date of Patent: Dec. 9, 2025

(54) POWER-ON-RESET REQUEST FUNCTIONALITY IN SEMICONDUCTOR DEVICES AND POWER MANAGEMENT ICs

(71) Applicant: NXP USA, Inc., Austin, TX (US)

(72) Inventors: Alaa Eldin Y El Sherif, Plano, TX (US); Jean-Philippe Meunier, Ayguesvives (FR); Loic Hureau, Sainte Marie d'Attez (FR); Thomas Henry Luedeke, Oberbergkirchen (DE); Maxime Clairet, Labastidette (FR)

(73) Assignee: NXP USA, Inc., Austin, TX (US)

( * ) Notice: Subject to any disclaimer, the term of this patent is extended or adjusted under 35 U.S.C. 154(b) by 192 days.

(21) Appl. No.: 18/356,055

(22) Filed: Jul. 20, 2023

(65) Prior Publication Data

US 2024/0053808 A1 Feb. 15, 2024

(30) Foreign Application Priority Data

Aug. 10, 2022 (EP) .................................. 22306207

(51) Int. Cl.
 *G06F 1/24* (2006.01)
 *G06F 1/28* (2006.01)
(52) U.S. Cl.
 CPC . *G06F 1/24* (2013.01); *G06F 1/28* (2013.01)
(58) Field of Classification Search
 CPC .. G06F 1/24; G06F 1/28; H03K 17/22; H03K 7/08
 See application file for complete search history.

(56) References Cited

U.S. PATENT DOCUMENTS

| 5,850,156 A | 12/1998 | Wittman | |
| 7,711,869 B1* | 5/2010 | Strickland | G06F 1/24 714/21 |
| 10,474,846 B1 | 11/2019 | Rezayee et al. | |
| 2008/0246509 A1* | 10/2008 | Xiao | G06F 1/24 327/143 |
| 2010/0141320 A1* | 6/2010 | Lin | H03K 5/05 327/198 |
| 2010/0195355 A1* | 8/2010 | Zheng | H02M 3/33507 363/21.12 |
| 2019/0140534 A1 | 5/2019 | Lo et al. | |
| 2019/0265769 A1 | 8/2019 | Gelman et al. | |
| 2022/0077761 A1* | 3/2022 | Huang | H03K 17/22 |
| 2023/0411971 A1* | 12/2023 | Peng | H02J 7/007188 |

* cited by examiner

*Primary Examiner* — Kim Huynh (57) ABSTRACT

A semiconductor circuit is disclosed, comprising: a processor; a supply-voltage terminal arranged to receive a supply voltage; an out-of-range-voltage-detection circuit, coupled to the supply-voltage terminal and configured to output a voltage-out-of-range indicator in response to detecting that the supply voltage is out-of-range; a PWM signal generator configured to generate a PWM signal; a power-on-reset request terminal arranged to output the PWM signal during a normal operation of the processor; and logic circuitry between the signal generator and the POR request terminal and configured to modify the PWM signal in response receiving the voltage-out-of-range indicator. A microcontroller circuit incorporating such a semiconductor circuit, and a PMIC circuit for use in conjunction, are also disclosed.

14 Claims, 4 Drawing Sheets

POWER-ON-RESET REQUEST FUNCTIONALITY IN SEMICONDUCTOR DEVICES AND POWER MANAGEMENT ICs

CROSS-REFERENCE TO RELATED APPLICATIONS

This application claims the priority under 35 U.S.C. § 119 of European Patent application no. 22306207.6, filed on 10 Aug. 2022, the contents of which are incorporated by reference herein.

FIELD

The present disclosure relates to semiconductor circuits, microcontroller ICs ("MCUs") incorporating such semiconductor circuits, power management ICs ("PMICs"), and systems comprising MCUs and PMICs

BACKGROUND

The power for modern microcontroller units (MCUs) and other semiconductor devices is typically provided by a separate integrated circuit or device. Increasingly the separate device incorporates power monitoring and power management for the MCU or other semiconductor device, and such devices are thus known as power management ICs or PMICs. Hereinbelow the MCU or other semiconductor device will be referred to simply as "MCU" without limitation PMICs supply power to the MCU at a specified supply voltage VDD and generally include a feedback signal (VDD_sense) from the MCU, for providing an indication of the supply voltage at the MCU, in order to regulate the supply voltage VDD. In addition, the feedback signal may be used for power management and monitoring functionality. In particular, modern PMICs may include monitoring circuits to check that the feedback signal is neither undervoltage nor overvoltage. If the sensed VDD is either undervoltage or overvoltage, that is to say if the sensed VDD is either above a first reference value or below a second reference value, it is possible that the MCU may have failed, or may have entered an unsafe state, such as in particular operating above a maximum safe voltage or below a minimum safe voltage. The undervoltage and overvoltage monitoring may form part of a fail-safe state machine (FSM), which may also be referred to as a finite state machine. The PMIC may include a reset output pin, connected to the fail-safe state machine in order to instruct the MCU to undergo a reset. Furthermore, the PMIC may include a fail-safe output pin, which may be connected to a safety switch or another external peripheral device or circuit and/or the MCU.

Some MCUs include their own safety monitoring functionality, such as overvoltage monitoring or undervoltage monitoring. Furthermore, the MCU may include error detection circuitry. It would be desirable to be able to communicate such overvoltage, undervoltage, or other error state signals to the PMIC from the MCU in a reliable way.

SUMMARY

According to a first aspect of the present disclosure, there is provided a semiconductor circuit comprising: a processor; a supply-voltage terminal arranged to receive a supply voltage; an out-of-range-voltage-detection circuit, coupled to the supply-voltage terminal and configured to output a voltage-out-of-range indicator in response to detecting that the supply voltage is out-of-range; a PWM signal generator configured to generate a PWM signal; a power-on-reset, POR, request terminal arranged to output the PWM signal during a normal operation of the processor; and logic circuitry between the PWM signal generator and the POR request terminal and configured to modify the PWM signal in response receiving the voltage-out-of-range indicator.

The uninterrupted and unmodified PWM signal may be used by an associated semiconductor device such as a PMIC to confirm that the semiconductor circuit is operating correctly; conversely, any modification to the PWM signal, such as that which would be introduced in response to the semiconductor circuit determining a out of range supply voltage may provide an indicator, for instance in order to determine that corrective action should be taken. Moreover any interruption to the PWM signal may equally be indicative that the circuit is not operating as planned, or there may have been a malicious attack. According to this aspect then, the results of a watchdog circuit such as the voltage out of range circuit may be reliably communicated to an associated semiconductor device According to one or more embodiments, the processor comprises the PWM signal generator. Interruption to the PWM signal generation may thus be indicative that the processor is not operating as expected According to one or more embodiments, the semiconductor circuit further comprises an error-detection circuit configured to detect an error and output an error indicator in response to detecting an error; and wherein the logic circuitry is further configured to modify the PWM signal in response to receiving the error indicator. Modification to the same PWM signal may thus provide an indication of other faults or errors. The modification to the PWM signal may be the same modification, in case of either the voltage-out-of-range signal or the other faults or errors, or may be a different modification in order to differentiate between, in the first case, a voltage-out-of-range signal and, in the second case, the other faults or errors.

According to one or more embodiments, the processor comprises the error-detection circuit.

According to one or more embodiments, the out-of-range-voltage-detection circuit comprises a high-voltage detection, HVD, circuit configured to detect an over-voltage of the supply voltage, and a low-voltage detection, LVD, circuit configured to detect an 4 of the supply voltage.

According to one or more embodiments the PWM signal generator is configured to provide the PWM signal with a fixed frequency and a fixed duty cycle. Thus in normal operation the PWM signal may be considered to be a simple square-wave with a preset duty cycle. The PWM signal has a duty cycle which is greater than 50%. This may be useful in increasing or improving the time-sensitivity of the system to errors According to another aspect of the present disclosure, there is disclosed a microcontroller integrated circuit comprising such a semiconductor circuit. The microcontroller is configured to receive the supply voltage from a power management IC PMIC. The microcontroller integrated circuit MCU may be configured to include multiple cores of processor circuits.

The microcontroller IC, MCU, may further comprise a reset input terminal configured to receive a reset signal from the power management IC in response to one of: the logic circuitry modifying, and an interruption to, the PWM signal on the POR request output terminal.

According to a further aspect of the present disclosure, there is disclosed a power management IC, PMIC, comprising a power-on-reset, POR, request input terminal, a POR detector circuit coupled to the POR request input terminal, configured to: identify a one of a modification of and an interruption to a PWM signal received at the POR request input terminal, and output a POR request in response to identifying the modification of or interruption to the PWM signal. The PMIC may be configured to cooperate with an MCU as discussed above. Together the PMIC and MCU may comprise a system. The PMIC and MCU may be separately packaged or may be packaged as a single device.

According to one or more embodiments, the PMIC further comprises a fail-safe finite state machine, FSM, wherein the FSM comprises the POR detector circuit. The method may further comprise an undervoltage-detection circuit, and an overvoltage-detection circuit. Including undervoltage detection and overvoltage detection on the PMIC may be useful in improving the management functionality of the PMIC, and in particular in ensuring safe operation of the PMIC and the MCU which it powers.

According to a yet further aspect of the present disclosure, there is provided a system comprising the microcontroller IC and the PMIC. The undervoltage-detection circuit and the overvoltage-detection circuit may be configured to be triggered by respective voltages which are lower, and higher than corresponding trigger voltages in the semiconductor device LVD and HVD circuit. Thereby, it may be provided that the watchdog functionality of the MCU and in particular the POR_req interferes with the OV/UV safety functionality of the FSM within the PMIC These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments

DETAILED DESCRIPTION OF EMBODIMENTS

Figure 1:
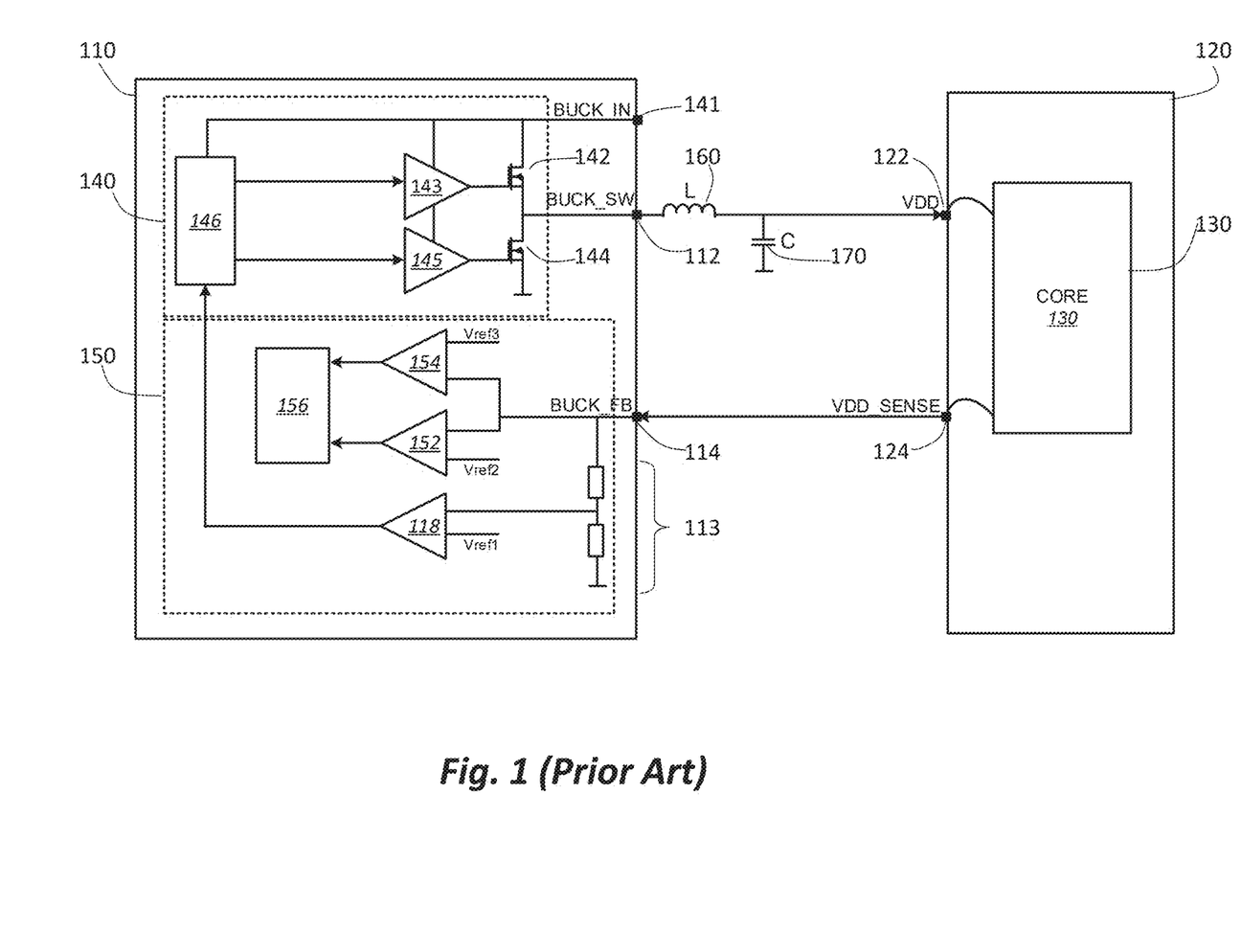
FIG. 1 illustrates a system comprising an MCU and the PMIC.

FIG. 1 illustrates a conventional system comprising a power management IC (PMIC) 110 and a microcontroller unit (MCU) 120. The MCU 120 may include a microprocessor 130 which may also be referred to hereinafter as a core or microprocessor core. The PMIC 110 may be considered as having two parts: a first part may be described as a power generation part or power generation circuit 140, and the second part be described as a power management part or power management circuit 150. The PMIC provides power at a supply voltage VDD to the MCU 120 at VDD pin 122. To do so it includes the switches of a converter, which in this instance is a DC-DC buck converter. The skilled person will appreciate that other types of converters, such as low drop out regulator's (LDO), may be used in place of the DC-DC converter. The buck converter is configured and controlled in a known manner, and has a high-side switch 142 and low-side switch 144 connected in series between an input voltage (BUCK_IN) 141 and a ground. The switches are controlled, through drivers 143 and 145 respectively from controller 146. The node between the high side switch and low side switches is connected, at pin BUCK_SW 112 to an inductor 160. The inductor output provides VDD to the MCU 120. There is included a capacitor 170 between the output inductor and ground. In order to provide feedback for the control of VDD, a separate pin 124 on the MCU 120 is configured to sense VDD and provide a signal VDD SENSE back to the PMIC 110 at a pin BUCK_FB 114. The VDD SENSE signal received at pin 114 is fed back to the controller 146. This may be done, as shown through voltage divider 116 and comparator 118 which compares the divided voltage with a reference level Vref1. In other systems, the feedback of the regulator may be connected directly to the output of the regulator. Whether or not a voltage divider is used generally depends of the type of MCUs that is being powered.

In addition to providing the feedback signal for the DC-DC converter, the VDD_SENSE signal may also be used, by the PMIC, to detect under or over voltages. To do so the PMIC is provided with comparators 152 and 154 which compare the VDD sensed signal with reference voltages Vref2 and Vref3 respectively, which may be set at lower and upper voltage limits for VDD in order to provide undervoltage monitoring and overvoltage monitoring. The results of the comparator are input into a fail-safe state machine (FSM) 156. In the event of a undervoltage or overvoltage, or one which lasts longer than a predetermined time, the FSM may instruct the PMIC and/or the MCU to implement a soft shutdown or reset, for instance by powering down, or to perform a power-on-reset (POR), in order to protect the MCU from permanent damage.

The skilled person will appreciate that the boundary between the power generation part 140 and power management part 150 of PMIC 110 are not necessarily rigid. For example, the feedback circuit to the controller 146 is shown in FIG. 1 as being part of the power management part 150. However, this feedback circuit, including the comparator 118 with the reference voltage Vref1 and the voltage divider 116 may, in other PMICs, be considered not to be part of the power management circuit but to be a part of the power generation circuit 140. In still other PMICs, one or more elements of this feedback circuit may be included in both the power management part 150 and the power generation part 140.

Modern MCU devices such as that described in FIG. 1 above typically have very tight operating range requirements to ensure proper timing as well as reliable operation. A precise voltage may be required to be supplied to the processor(s) or core(s), in particular, and this requirement is insured via the undervoltage over voltage monitors on the PMIC as described. The present disclosure addresses, among other things, cases where the monitoring may be compromised due to system faults or even intentional tampering associated with malicious hacking attempts. In order to do so, an architecture is provided, such as that shown in FIG. 2, which integrates a PVT (Process Variation and Temperature) supervisory scheme on the processor with low-voltage detection (LVD) and high-voltage detection (HVD) monitors. The LVD on the MCU detects an undervoltage condition with a short filtering time (which for example may be 5 µs or less) as a result of a VDD supply undershoot that may prevent the correct operation of the MCU. In order not to conflict with the undervoltage monitoring on the PMIC, the LVD threshold may typically be lower than that of the PMICs undervoltage monitor (Vref2). Similarly, the HDV on the MCU 120 detects an overvoltage condition with a short filtering time (again this typically may be 5 µs or less) as a result of a VDD supply overshoot that may prevent correct operation of the MCU. Again, in order not to conflict with the overvoltage monitoring on the PMIC, the HVD threshold may typically be greater than that of the PMIC's overvoltage monitoring reference (Vref3). This variation of an MCU watchdog is combined within the present disclosure with a form of PWM signal to communicate information from the MCU to the PMIC resulting in effective fault detection and monitoring and providing for corrective action to be undertaken under the control of a fail-safe state machine in the PMIC.

Figure 2:
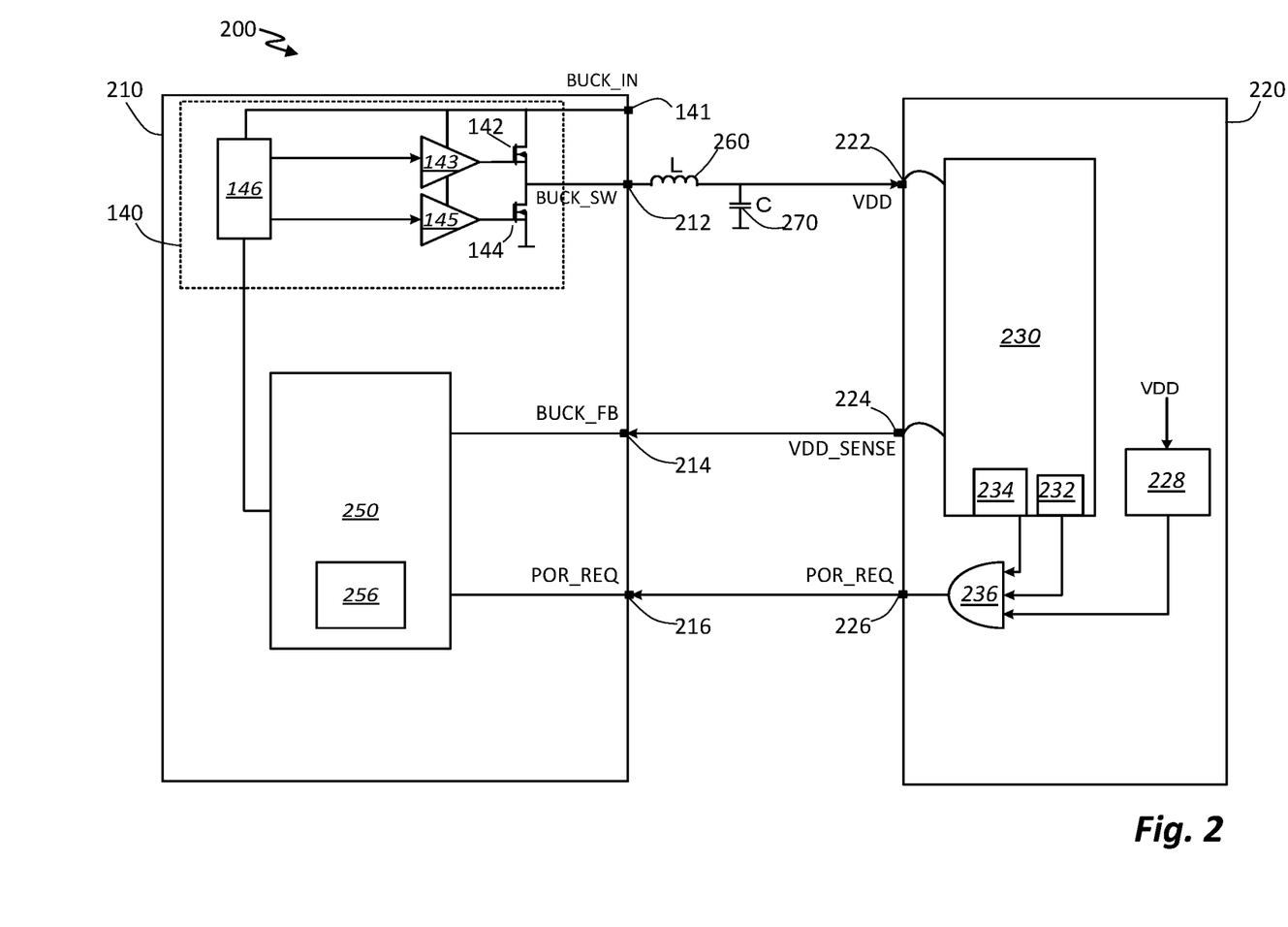
FIG. 2 illustrates a system comprising an MCU and a PMIC and including a power-on-reset request channel, according to one or more embodiments.

FIG. 2 illustrates a system 200 according to one or more embodiments. The system 200 comprises a PMIC 210 and an MCU 220. The PMIC includes the DC-DC converter controller 146 and switches 142 and 144, driven by respective drivers 143 and 145, to supply a switch node BUCK_SW 212. The DC-DC buck converter is similar to that shown in FIG. 1 and includes an inductor 260 and a capacitor 270. The inductor and capacitor are typically provided off chip as discrete components. Operation of the DC-DC converter is the same as in the conventional PMIC depicted in FIG. 1.

The MCU 220 comprises a supply-voltage terminal 222, and a VDD_SENSE terminal 224. Supply-voltage terminal 222 is arranged to receive a supply voltage, VDD from the PMIC 210, and the VDD sensed terminal is connected to BUCK_FB pin 214 on the PMIC for sensing the supply voltage. The MCU 220 further comprises a power-on-reset request (POR request) terminal 226. The POR request terminal is arranged to output a PWM signal during a normal operation of the processor, as will be discussed in more detail hereinbelow. The MCU 220 further comprises an out-of-range-voltage-detection circuit 228. The out-of-range-voltage-detection circuit 228 is coupled to the supply-voltage terminal and supply voltage VDD and is configured to output a voltage-out-of-range indicator, as will also be discussed in more detail hereinbelow. MCU 220 further comprises one or more cores 230. The one or more cores 230 may also be known as processors or microprocessors. MCU 220 further includes an error-detection circuit 232. Error-detection circuit 232 is configured to detect an error and output an error indicator. Typically the error may correspond to a fault state of the core such as a stack overflow condition or other fault states with which the skilled person will be familiar. However, the error is not limited thereto and may include for instance a failure of an internally generated "safe clock" which may typically be used to clock safety-related and other important or critical functions. Another error which may, in some embodiments, be detected by the error detection circuit 232 is a "hang" error, for example such as when trying to execute a recovery from a severe or critical fault—or when the hardware reset state machine "hangs". The MCU 220 further comprises a PWM signal generator 234, which is configured to output a PWM signal to the POR request terminal. The MCU 220 further comprises logic circuitry 236 between the PWM signal generator and the POR request terminal and configured to modify the PWM signal in response receiving at least one of the voltage-out-of-range indicator and the error indicator. The logic circuitry 236 modifies the PWM signal such that the modified signal is present on the POR request terminal 226. The modification to the PWM signal may be the same modification, in case of either the voltage-out-of-range signal or the other faults or errors as for example may be indicated by the error indicator, or may be a different modification in order to differentiate between, in the first case, a voltage-out-of-range signal and, in the second case, other faults or errors such as may be indicated by the error indicator. For example, it may be that a different duty cycle, or frequency is selected to be representative of different types of faults or errors Returning to the PMIC 210, this comprises a further input terminal POR_REQ 216, for receiving the power-on-reset request from the MCU 220. The input terminal POR_REQ 216 is connected to the power management circuitry 250 within the PMIC 210. In particular, the input terminal POR_REQ 216 may be connected to a fail-safe state machine (FSM) 256.

In normal operation, the power management circuitry 250, or in particular, the FSM 256, identifies the PWM signal terminal POR_REQ 216, and allows for normal operation of the PMIC 210. However, in the event that the PWM signal has been either modified or interrupted by either the control logic 236 or otherwise, as will be discussed in more detail hereinbelow, the power management circuitry 250 or FSM 256 identifies that the PWM signal has been modified or interrupted, and instructs the PMIC 210 to take appropriate action which may include corrective action, and in particular may include a power-on-reset, or other actions to put the system into a safe state.

Figure 3:
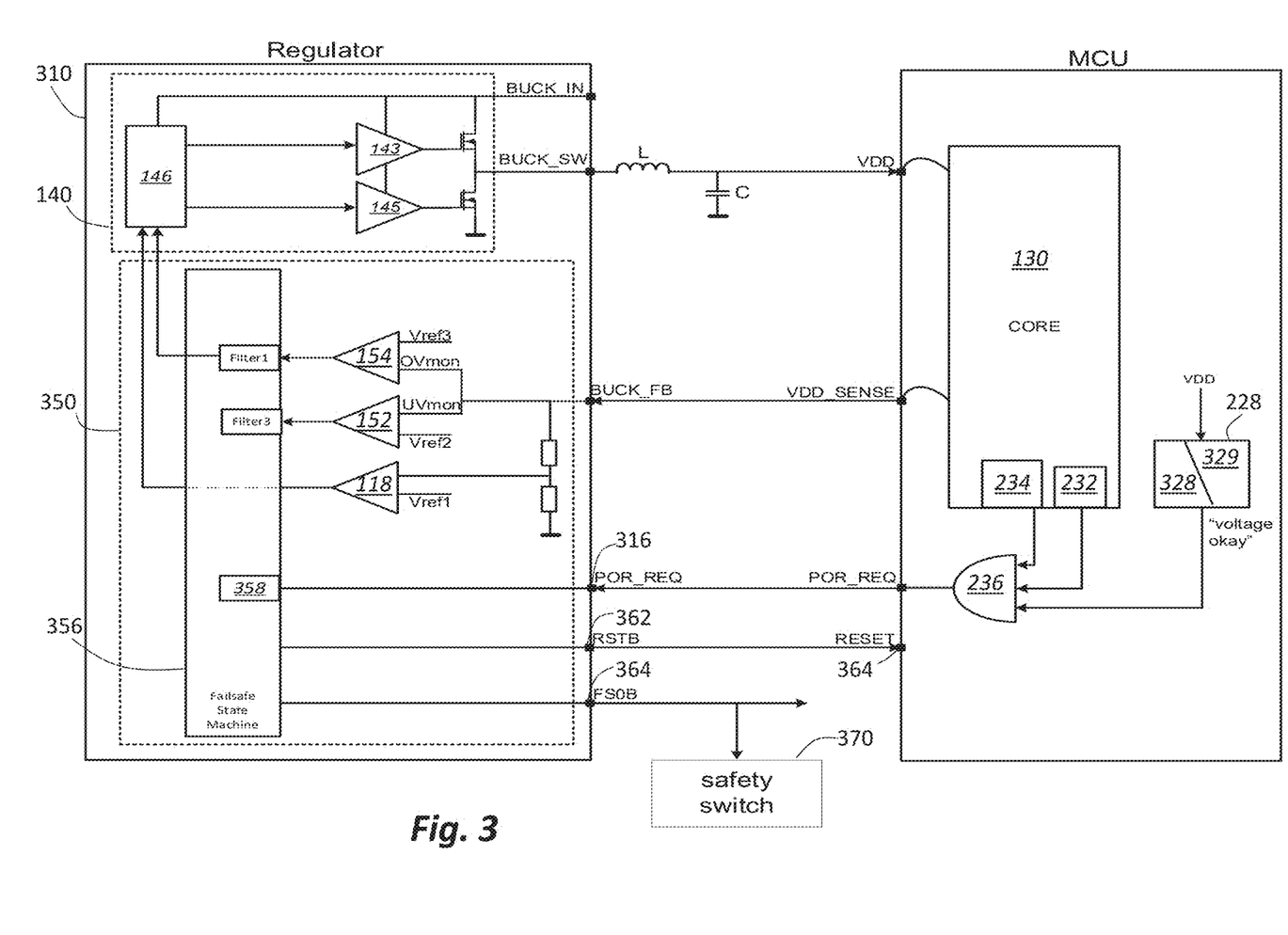
FIG. 3 illustrates a system such as that shown in FIG. 2, in more detail.

FIG. 3 illustrates the system 300 according to one or more embodiments. The system 300 may be the same or similar to system 200. The system includes a PMIC 310 and an MCU 320. The PMIC 310 includes a power generation part 140. The power generation part may be the same as that in FIG. 1 or FIG. 2. The PMIC 310 includes a power management part 350. The power management part 350 may include overvoltage circuitry comprising comparator 154 comparing the feedback signal from VDD sensed to a reference voltage Vref3, and undervoltage circuitry comprising comparator 152 comparing the feedback signal from VDD sensed to a second further reference voltage Vref2. PMIC 310 may include a feedback circuit for controlling the timing of the switches in the DC-DC converter. The feedback circuit may comprise a comparator 118 which compares a scaled version of the feedback voltage output by VDD sensed with a reference voltage Vref1, and pass the results to the controller 146 in the power generation part 140 of the PMIC 310. Similar to the embodiment shown in FIG. 2, the feedback circuit or part of it may be comprised within the power management part 350 of PMIC 310, or may be separate therefrom. The power management part 350 of PMIC 310 includes a FSM 356. The FSM 356 may include a power-on-reset (POR) detector circuit 358, which is connected to a POR_REQ terminal 316, and is configured to detect that PWM signal received at the POR_REQ terminal 316 which is both unmodified and uninterrupted, with respect to that generated or expected. Provided the POR detector circuit 358 is unmodified and uninterrupted, POR detect circuit 358 does not interfere with continued operation of the PMIC. It will be appreciated by the skilled person that the PMIC must be programmed or configured to cooperate with the MCU 320 in order that the POR detection circuit 358 knows the frequency and duty cycle of PWM signal to expect from the MCU 320. As shown in FIG. 3, the FSM 356 may be connected to a further output terminal RSTB 362 on the PMIC 310 which may be, in use, connected to a reset terminal 234 on the MCU 320. The FSM 356 may be configured to output a reset signal to the further output terminal RSTB 362, in order to pass a reset command to the MCU 320. As indicated by the nomenclature "B" in the terminal label RSTB, the reset signal may be active low. Furthermore, the PMIC 310 may include a further fail-safe output terminal FSOB 364. The terminal FSOB may provide the output from the FSM 356. In use the output FSOB 364 may be connected to an external component such as a safety switch 370.

Figure 4:
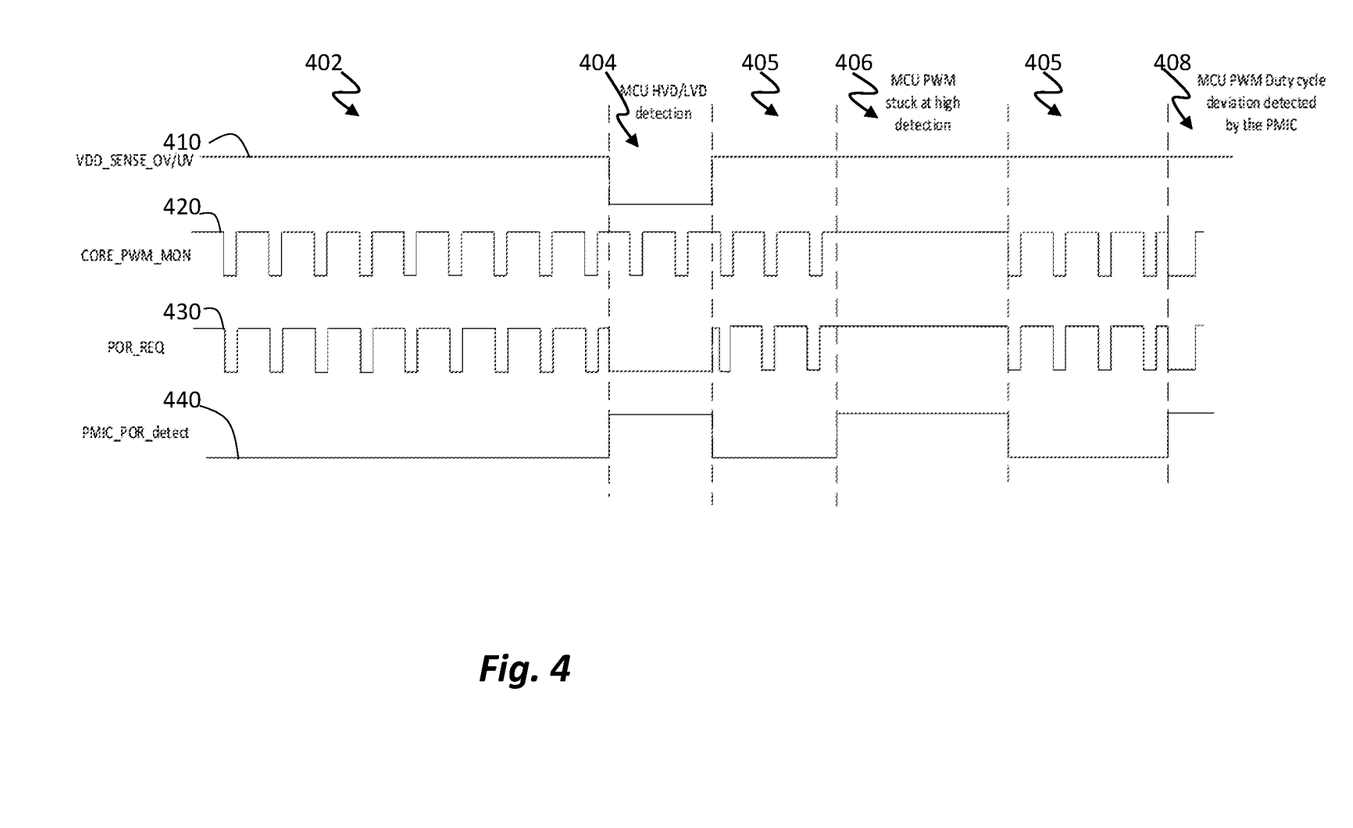
FIG. 4 illustrates various waveforms according to one or more embodiments.

As shown in FIG. 3, the out-of-range-voltage-detection circuit 228 may comprise a high-voltage detection (HVD) circuit 328 configured to detect an over-voltage of the supply voltage, and a low-voltage detection (LVD) circuit 329 configured to detect an undervoltage of the supply voltage. The logic circuitry 236 may comprise an AND gate as shown, having inputs connected to the error detection circuitry to receive the error signal, the out-of-range-voltage-detection circuit, and the PWM signal generator. The operation of the logic circuitry may be as shown in FIG. 4. The skilled person will appreciate that alternative logic circuitry may alternatively be used, output waveforms as that shown in FIG. 4.

FIG. 4 shows waveforms associated with POR_req, plotted against time, according to one or more embodiments. Starting at the top of the figure, there is shown an output 410 of the out-of-range-voltage-detection circuit 228, (VDD_SENSE_OV/UV). Below this is an output 420 from the PWM signal generator 234 (CORE_PWM_MON). Below this there is shown the signal 430 received at the POR_req terminal. And finally, the lowermost signal shown is the output of the POR detector circuit 358 (PMIC_POR_detect). Starting at the left of the diagram is shown the signals in normal operation of the MCU. The output 410 of the out-of-range-voltage-detection circuit 228, (VDD_SENSE_OV/UV), is high, indicating "voltage OK", or that "voltage-out-or-range" is FALSE. (It will be appreciated that in this embodiment, the "out-of-range-voltage-detection-circuit" is configured to output a high signal is not out-of-range (that is to say it is in range, for example because neither undervoltage on or overvoltage have been triggered) and a low signal when the voltage is out-of-range (that is to say, it is not in range).

In embodiments which include an error-detection circuit configured to detect an error and output an error indicator in response to detecting an error, the corresponding signal (not shown) for the error indicator would also be high, corresponding to that for VDD_SENSE_OV/UV. In the embodiment illustrated in FIG. 4, the PWM signal generator output 420 and out-of-range-voltage-detector circuit output 410 are combined by an AND logic circuit to provide the POR_req signal 430. During normal operation as shown at 402 the POR_req signal 430 thus is a copy of the PWM signal generator output 420. During this operation the POR detector circuit 358 matches the frequency and duty cycle of the POR_req signal 430 to that which is expected, and outputs a signal 440 indicative that MCU is operating correctly, or conversely that there is no request for a POR. In this example the signal (PMIC_POR_detect) is high when asserted so signal 440 is low.

Looking now at the time interval shown generally at 404, during this time interval, the MCU VDD deviates from its allowable range, and is either undervoltage or overvoltage. As a result the output 410 of the out-of-range-voltage-detection circuit 228 is asserted (that is to say, it goes low). The AND logic circuit forces the POR_req signal low. This interruption to the PWM signal is detected by the POR detector circuit 358 which thus goes high as it asserts that there is a POR request coming from the MCU.

In the event that the overvoltage or undervoltage ceases, that is to say VDD on the MCU returns into the acceptable range, signal 410 (VDD_sense_OV/UV) is reset high and the POR_req signal 430 once again starts to output a PWM signal matching the signal 420 that generated by the PWM signal generator. This is shown in FIG. 5 at interval 405.

Next considering the interval 406. During this interval, the Vdd voltage is within range so signal 410 remains high. However a fault or glitch in the core processor 130 results in an interruption of failure of the PWM signal generator 234. In the example shown the signal is stuck at "high", but it could equally be stuck at "low". As a result the POR_req signal 430 is constant instead of a PWM signal, and the POR detector circuit 358 fails to detect a PWM signal having the correct frequency and duty cycle. It thus goes high as it asserts that there is a POR request coming from the MCU.

In the event that the fault or glitch in the core processor 130 terminates or is corrected, the PWM signal restarts and the signals return to their normal operation state shown by another time interval 405.

Finally, there is shown, at 408, the results of a deviation in the duty cycle of signal produced by the PWM signal generator. The PWM signal with modified duty cycle is input to the POR detector 358 which identifies that the PWM signal does not have the expected duty cycle, and as a result once again goes high and asserts that there is a POR request coming from the MCU.

In some applications, the PWM signal duty cycle may be preset to be greater than 50%. This may enable the PMIC to identify a POR request in the case of a short undervoltage or overvoltage event. Furthermore, this may reduce or eliminate the likelihood that the LVD/HVD voltage okay output is low only during a low phase of the PWM signal oscillation. An appropriate duty cycle may be selected based on the minimum duration of an undervoltage or overvoltage condition for the specific technology of the application. Moreover, a deglitch time, typically of a few microseconds, may be added on the PMIC side to filter short faults.

In some applications, the POR_req detector circuit 358 may be disabled while the PMIC and the MCU are initially powered up and may remain disabled until the PMIC has completed its configuration and confirmed that the system is operating okay, for instance by performing a PMIC self testing routine and enough time has elapsed for the MCU to start generating the POR_req signal. In such applications, if the POR_req signal does not start to oscillate according to the predetermined specifications within a certain time interval, the PMIC may detect this as being a fault.

In some applications and particularly during very low power modes, a PWM signal on the POR_req terminal or pin may consume more power than is budgeted or appropriate for that mode. The MCU may therefore be configured to keep the pin in a static state, during such a mode. It will be appreciated that under normal operating conditions they would provide a indication to the PMIC that the MCU is in a fault state (or under or overvoltage). The POR_req reset operation should be disabled in such a mode, in order to do so the PMIC may be notified at the beginning and end of this operation mode using a known low-power mode entry or exit handshake mechanisms configured within the MCU.

As used herein, the term terminal may also be referred to as a pin (such that an input terminal corresponds to an input pin and an output terminal corresponds to an output pin).

The skilled person will be familiar that a terminal or pin may take any one of a variety of physical forms, depending on the specific packaging technology used.

From reading the present disclosure, other variations and modifications will be apparent to the skilled person. Such variations and modifications may involve equivalent and other features which are already known in the art of PMIC., and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims [delete if not relevant] and reference signs in the claims shall not be construed as limiting the scope of the claims. Furthermore, the word "may" is used in a permissive sense (i.e., meaning having the potential to), rather than the mandatory sense (i.e., meaning must). Similarly, the words "include," "including," and "includes" mean including, but not limited to.

LIST OF SYMBOLS 110 power management IC
112 pin BUCK_SW
114 pin BUCK_FB
116 voltage divider
118 comparator
120 microcontroller unit, MCU
124 pin VDD_SENSE
130 microprocessor
140 power generation circuit
150 power management circuit
122 VDD pin
140 power generation part
141 input voltage BUCK_IN
142 highside switch
143, 145 drivers
144 low side switch
146 controller
150 power management part
152 comparator
154 comparator
156 fail-safe state machine
160 inductor
170 capacitor
200 system
210 PMIC
212 switch node BUCK_SW
214 pin BUCK_FB
216 input terminal POR_REQ
220 microcontroller unit, MCU
222 supply-voltage terminal
224 VDD_SENSE terminal
226 POR_req terminal
228 out-of-range-voltage-detection circuit
230 processor or core
232 error detection circuit
234 PWM signal generator
236 logic circuitry
250 a power management circuitry
256 fail-safe state machine, FSM
260 inductor
270 capacitor
300 system
310 PMIC
212 switch node BUCK_SW
214 pin BUCK_FB
216 input terminal POR_REQ
320 MCU
328 high-voltage detection circuit
329 low-voltage detection circuit
350 power management part
356 FSM
358 POR detector circuit
362 reset terminal RSTB
364 failsafe output terminal FSOB
370 safety switch
402, 405 normal operation intervals
404 out-of-range-voltage interval
406 PWM stuck at hi interval
408 PWM duty cycle deviation interval
410 out-of-range-voltage-detection circuit output waveform
420 PWM signal generator output
430 POR_req signal
440 MCU correct operation signal

What is claimed is:

1. A semiconductor circuit comprising:
   a processor;
   a supply-voltage terminal arranged to receive a supply voltage;
   an out-of-range-voltage-detection circuit, coupled to the supply-voltage terminal and configured to output a voltage-out-of-range indicator in response to detecting that the supply voltage is out-of-range;
   a PWM signal generator configured to generate a PWM signal;
   a power-on-reset, POR, request terminal arranged to output the PWM signal during a normal operation of the processor to a POR detector circuit of a power management circuit (PMIC); wherein the POR detection circuit is configured to identify the signal received from the POR request terminal; and
   logic circuitry between the PWM signal generator and the POR request terminal and configured to modify the PWM signal in response receiving the voltage-out-of-range indicator to provide an output to the POR request terminal.

2. The semiconductor circuit of claim 1, wherein the processor comprises the PWM signal generator.

3. The semiconductor circuit of claim 1, further comprising an error-detection circuit configured to detect an error and output an error indicator in response to detecting an error; and wherein the logic circuitry is further configured to modify the PWM signal in response to receiving the error indicator.

4. The semiconductor circuit of claim 3, wherein the processor comprises the error-detection circuit.

5. The semiconductor circuit of claim 1, wherein the out-of-range-voltage-detection circuit comprises
a high-voltage detection, HVD, circuit configured to detect an over-voltage of the supply voltage, and
a low-voltage detection, LVD, circuit configured to detect an undervoltage of the supply voltage.

6. The semiconductor circuit of claim 1, wherein the PWM signal generator is configured to provide the PWM signal with a fixed frequency and a fixed duty cycle.

7. The semiconductor circuit of claim 6, wherein the PWM signal generator comprises a one of a set of registers, and one-time-programmable, OTP, circuit, configured to provide the fixed frequency and a fixed duty cycle.

8. The semiconductor circuit of claim 6, wherein the PWM signal has a duty cycle which is greater than 50%.

9. A power management IC (PMIC), comprising
a power-on-reset (POR) request input terminal,
a POR detector circuit coupled to the POR request input terminal, and configured to:
identify a one of a modification of and an interruption to a PWM signal received at the POR request input terminal, and
output a POR request in response to identifying the modification of or interruption to the PWM signal;
wherein the PMIC is configured to be coupled to and provide a supply voltage to a microcontroller integrated circuit (IC);
wherein the microcontroller IC includes,
a supply-voltage terminal configured to receive the supply voltage;
an out-of-range-voltage-detection circuit, coupled to the supply-voltage terminal and configured to output a voltage-out-of-range indicator in response to detecting that the supply-voltage is out-of-range;
a PWM signal generator configured to generate the PWM signal;
the power-on-reset (POR) request output terminal arranged to output the PWM signal to the POR request input terminal of the PMIC during a normal operation of a processor; and
logic circuitry between the PWM signal generator and the POR request output terminal and configured to modify the PWM signal in response receiving the voltage-out-of-range indicator.

10. The PMIC of claim 9, further comprising a fail-safe finite state machine, FSM, wherein the FSM comprises the POR detector circuit.

11. The PMIC of claim 9, further comprising an undervoltage-detection circuit, and an overvoltage-detection circuit.

12. A system comprising: comprising
a microcontroller integrated circuit (IC), and
a power management IC (PMIC);
wherein the microcontroller integrated circuit (IC) is configured to receive a supply voltage from the PMIC, and comprises:
a processor;
a supply-voltage terminal arranged to receive the supply voltage; an out-of-range-voltage-detection circuit, coupled to the supply-voltage terminal and configured to output a voltage-out-of-range indicator in response to detecting that the supply-voltage is out-of-range;
a PWM signal generator configured to generate a PWM signal; a power-on-reset (POR) request terminal arranged to output the PWM signal during a normal operation of the processor; and
logic circuitry between the PWM signal generator and the POR request terminal and configured to modify the PWM signal in response receiving the voltage-out-of-range indicator and to provide the output to the POR request terminal;
wherein the PMIC comprises:
a POR request input terminal, and
a POR detector circuit, coupled to the POR request input terminal, and configured to:
identify a one of a modification of and an interruption to the PWM signal received at the POR request input terminal, and
output a POR request in response to identifying the modification of or interruption to the PWM signal.

13. The system as claimed in claim 12, wherein the out-of-range-voltage-detection circuit comprises
a high-voltage detection (HVD) circuit configured to detect an over-voltage of the supply voltage, and
a low-voltage detection (LVD) circuit configured to detect an undervoltage of the supply voltage.

14. A system as claimed in claim 13, wherein the PMIC further comprises an undervoltage-detection circuit and an overvoltage-detection circuit; and
wherein the undervoltage-detection circuit and the overvoltage-detection circuit are configured to be triggered by respective voltages which are lower, and higher than corresponding trigger voltages in the semiconductor device LVD and HVD circuit.

* * * * *